(12) United States Patent
Hikita et al.

(10) Patent No.: US 6,393,418 B1
(45) Date of Patent: May 21, 2002

(54) METHOD OF AND APPARATUS FOR SORTING A FILE

(75) Inventors: Jun Hikita; Akifumi Mishima, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/477,508

(22) Filed: Jan. 4, 2000

(30) Foreign Application Priority Data

Jan. 6, 1999 (JP) .......................................... 11-001161

(51) Int. Cl.$^7$ .............................................. G06F 17/30
(52) U.S. Cl. .......................... 707/7; 707/102; 707/204; 707/508; 709/219
(58) Field of Search ............................ 707/7, 202, 203, 707/204, 508, 511, 1, 102, 512; 709/219; 355/27; 345/753

(56) References Cited

U.S. PATENT DOCUMENTS

| | | | |
|---|---|---|---|
| 4,945,475 A | * 7/1990 | Bruffey et al. | 707/1 |
| 5,768,514 A | * 6/1998 | Kamei | 345/753 |
| 5,944,792 A | * 8/1999 | Yamato et al. | 709/219 |
| 6,035,296 A | * 3/2000 | Fushimi | 707/7 |
| 6,147,742 A | * 11/2000 | Bell et al. | 355/27 |
| 6,233,583 B1 | * 5/2001 | Hoth | 707/102 |
| 6,278,990 B1 | * 8/2001 | Horowitz | 707/1 |
| 6,311,195 B1 | * 10/2001 | Hachiya et al. | 707/512 |

OTHER PUBLICATIONS

Arneson, David A., "Development of Omniserver", Control Data Corporation, Minneapolis, Minnesota, 1990 IEEE, pp. 88–93.*

Christman, R.D., "Experience with File Migration", Los Alamos Laboratory, Los Alamos, New Mexico, U.S. Department of Commerce, Natioanl Technical Information Service, Oct. 1981, pp. 1–13.*

Hac, Anna, "A Distributed Algorithm for Performance Improvement Through File Replication, File Migration, and Process Migration", IEEE Transactions on Software Engineering, vol. 15, No. 11, Nov. 1989, pp. 1459–1470.*

Thanhardt, Erich et al., "File Migration in the NCAR Mass Storage System" , NAtional Center for Atmospheric Research, Boulder, Colorado, 1988 IEEE, pp. 114–121.*

* cited by examiner

*Primary Examiner*—Hosain T. Alam
*Assistant Examiner*—Shahid Alam
(74) *Attorney, Agent, or Firm*—Frommer Lawrence & Haug LLP; William S. Frommer

(57) ABSTRACT

The invention is equipped with setting means for setting whether files under the same custody structure are preferentially selected, procuring means for procuring information on a day on which the last access was made and information on the file size regarding each one of the respective files stored in the memory means, calculating means for calculating a score regarding each of the respective files according to the number of days that have lapsed from the day of the last access and the file size, and selecting means for selecting a desired file from among the respective files by using the score and the result of the setting performed by the setting means. With this construction, when in the computer of hierarchy storage management type collectively replacing a file within the buffer memory with a file that is newly transferred from the main memory, it is so arranged that a plurality of files under the same directory can be collectively replaced.

6 Claims, 7 Drawing Sheets

| File | Score | Absolute Path |
|---|---|---|
| bunsho1 | S1 | ¥bunsho1 |
| bunsho11 | S11 | ¥bun¥bunsho11 |
| bunsho12 | S12 | ¥bun¥bunsho12 |
| bunsho21 | S21 | ¥bun2¥bunsho21 |
| bunsho22 | S22 | ¥bun2¥bunsho22 |
| bunsho23 | S23 | ¥bun2¥bunsho23 |

| Sequential Order | File |
|---|---|
| 1 | bunsho21 |
| 2 | bunsho12 |
| 3 | bunsho1 |

| Sequential Order | File | | |
|---|---|---|---|
| 1 | bunsho21 | bunsho22 | bunsho23 |
| 2 | bunsho11 | bunsho12 | |
| 3 | bunsho1 | | |

FIG. 10

| Sequential Order | File |
|---|---|
| 1 | bunsho21 |
| 2 | bunsho12 |
| 3 | bunsho23 |
| 4 | bunsho1 |
| 5 | bunsho22 |
| 6 | bunsho11 |

FIG. 11

Sorting with Path Names

| | | |
|---|---|---|
| bunsho21 | bunsho22 | bunsho23 |
| bunsho12 | | |
| bunsho1 | | |

METHOD OF AND APPARATUS FOR SORTING A FILE

BACKGROUND OF THE INVENTION

1. Technical Field

The invention of this application relates to a method of sorting a file and an apparatus therefor, which are suitably applied in order to produce a candidate-file list of the files that in the hierarchy storage management system are moved from a memory whose speed is high and whose capacity is small to a memory whose speed is low and whose capacity is large.

2. Description of the Related Art

In a computer, regarding a memory that is used to store therein files of program data, files of data to be processed (such as text data, image data and the like), etc. there has hitherto been a demand for more increase in capacity as the file size increases. Simultaneously, there has hitherto been a demand for more increase in speed (decrease in the access length of time) in order to shorten the processing length of time of the computer.

With the use of only one kind of memories, it is in reality impossible to make such increase both in capacity and in speed go together. For this reason, generally, in computers, a hierarchy storage management (Hierarchy Storage Management) system has been adopted.

In the hierarchy storage management system, there is used a memory that has a hierarchical construction wherein a high-speed and small-capacity memory (buffer memory) and a low-speed and large-capacity memory (main memory, external memory device) are used in combination. And the processing unit of the computer executes a program for realizing the hierarchy storage management (that is also called "an HSM software" by taking the capital letters of the Hierarchy Storage Management). And the unit thereby investigates whether the file that has been requested to be accessed exists within the buffer memory. If this file exists, the computer reads it out from the buffer memory. If it does not exist, the computer transfers it to the buffer memory from the main memory or the external memory and thereafter reads it out from the buffer memory.

As a result of this, since the file for which access request has been made even once is stored in the buffer memory, regarding this file it results that access is made to the buffer memory. The file for which access request has been made once has a general tendency (the localization of the access) that there is a high possibility of the access request being made again in the near future. Therefore, with the file for which access request is highly possibly made being stored in the buffer memory in this way, the frequency of access to the main memory or external memory device is decreased. Thereby, the average access length of time is shortened (namely, the increase both in capacity and in speed go together).

Meanwhile, since the buffer memory is small in capacity, a space area thereof becomes gradually smaller as long as files are only kept transferring from the main memory or the external memory device and finally it becomes impossible for new files to be transferred to the buffer memory. Therefore, the HSM software also needs to have an additional function of replacing a prescribed amount of files of the files already stored in the buffer memory with files that are newly transferred (e.g., after this prescribed amount of files is moved again from the buffer memory to the main memory or the external memory device, new files are transferred to the buffer memory).

In the conventional HSM software, the production of a candidate-file list of the files becoming an object to be replaced with such new transfer files (namely the sorting of the files that are taken up as candidate files) was performed, for example, as follows.

That is, regarding the respective files within the buffer memory, based on:

(11) the number of lapse days that lapse from the last access day of a file (day),

(12) the weight of the number of lapse days,

(13) the file size (kilobyte), and

(14) the weight of the file size, a calculation of the score is performed using the following equation (a).

$$\text{Score} = (11) \times (12) + (13) \times (14) \tag{a}$$

It is to be noted that the weights (12) and (14) are the ones which represent as an integer the ratio between the number of lapse days under the assumption that 1 day=1 kilobyte, for example and the file size. Also, there sometimes occurs a case where without using these weights the score is calculated by only using the lapse days number (11) and the file size (13).

And, by re-arranging the respective files in the sequential order from the file whose score is larger, a candidate-file list is produced.

After having produced a candidate-file list in this way, when performing actual replacement, the prescribed amount of files that is inserted in the upper sequential order of this candidate-file list is replaced with new transfer files.

By selecting a file as a candidate in the order of the file whose lapse days number from the day of the last access or the file whose file size is large in the above-described way, the one of the files within the buffer memory for which no recent access request is made (i.e., the file which since it is less likely that access request will be made again in the near future does not contribute to shortening the access length of time very much even if kept stored within the buffer memory), the one which occupies a large area (i.e., the file which gives a great effect on the enlargement of a space area by being replaced), etc. are preferentially replaced with new transfer files.

However, even the file whose lapse days number from the day of the last access is small is not always requested to be accessed again in the near future. Namely, among these files there can also exist the one whose last renewal day (the day on which the contents of the file were renewed last) is pretty old and which although the user recently casually accessed it is not destined to being accessed thereafter for a while.

However, in the conventional hierarchy storage management system, it is impossible that such a file is inserted in the upper order of the candidate-file list, unless its file size is extremely large. As a result, although such a file does not contribute to shortening the access length of time even if the file is kept stored within the buffer memory, it did not happen that such the file was preferentially replaced with a new transfer file.

Also, there may be a case where, of the files within the buffer memory, the user thinks he wants to more preferentially replace the file whose file size is large than the file whose lapse days number from the day of the last access is large, with a new transfer file, or may be a case where, conversely, the user thinks he wants to more preferentially replace the file whose lapse days number from the day of the last access is large than the file whose file size is large, with a new transfer file.

However, in the conventional hierarchy storage management system, as in the above-described equation (a), the score is calculated according solely to only the lapse days number from the day of the last access, the file size, and the weights that are primarily determined from the lapse days number and the file size. Therefore, there was no room for the user to flexibly decide which one of the file whose lapse days number from the day of the last access is large and the file whose file size is large he selectively preferentially replaces with a new transfer file.

Also, as in the case of the directories of, for example, an IBM-compatible personal computer, generally, the operating system (OS) of each of personal computers is equipped with the function of keeping files in custody by sorting them. In many cases, the user keeps a plurality of mutually associated files (e.g., the files associated with the same theme or the ones associated with the same customer) under the same directory. Accordingly, the files under the same directory are more likely to be simultaneously accessed when the user performs his search, etc.

Also, generally, the operating system (OS) is also equipped with the function of restoring the files that have been erroneously deleted. However, for example, in the IBM-compatible personal computer, this restoration of these files is also performed in units of a directory.

However, in the conventional hierarchy storage management system, even when the files that fall under the same directory are stored in the buffer memory, the production of a candidate-file list is performed completely independently of this storage.

Therefore, when replacing, there becomes large in number a case where only part of the files under this directory that has been inserted in the upper order of the candidate-file list is replaced with a new renewal file. And the remaining files are kept stored in the buffer memory as they are. In such a case, when a search, restoration, etc. is performed regarding the files under this directory, it becomes necessary that access be made to both of the main memory or external memory device and the buffer memory. As a result, the processing length of time such as a search, restoration, etc. inconveniently becomes large.

Also, regarding a plurality of ones of the files under this directory that have become destined to being replaced with new transfer files as well, due to their sequential orders in the candidate-file list being not successively determined, there become many cases where those files are discretely replaced (when they have been moved to the main memory or external memory device they are stored in their mutually separated areas). In such a case, when performing a search, restoration, etc. regarding the files under this directory, with respect to the main memory or external memory device access must be made to mutually separate areas thereof. As a result, the processing length of time such as a search, restoration, etc. none the less becomes large.

SUMMARY OF THE INVENTION

Accordingly, an object of the present invention is to enable, in a computer of hierarchy storage management type, preferentially replacing with a new transfer file the file whose last renewal day is old and which although having been recently casually accessed are not planned to be accessed thereafter for a while, flexibly deciding on the side of the user which one of the file whose lapse days number from the day of the last access is large and the file whose file size is large the user more preferentially replaces with a new transfer file, or collectively replacing a plurality of files under the same directory within the buffer memory with new transfer files.

It is to be noted that, in the specification of this application, it is defined that a thing which corresponds to the directory in the OS of each of various kinds of computers (for example, a folder corresponds to such a thing in the case of a Macintosh personal computer) is generically called "a custody structure".

In order to attain the above object, the present applicant proposes as described in claim 1 a method of selecting a file comprising a step of setting as lapse date conditions either one of a day on which the last renewal was made and a day on which the last access was made, a step of procuring information on the set lapse date conditions and information on the file size regarding each one of a plurality of files stored in the memory means, a step of calculating a score regarding each of the respective files according to the number of days that have lapsed from the lapse date conditions and the file size, and a step of selecting a desired file from among the respective files by using the score.

According to this method of sorting, when setting either one of the day of the last renewal and the day of the last access as the lapse date conditions, a file is selected from among a plurality of the files stored in the memory means by using the score that has been calculated according to the lapse days number from the lapse date conditions and the file size.

Accordingly, in a case where to set the day of the last renewal as the lapse date conditions, a file is selected using the score that has been calculated according to the lapse days number from the day of the last renewal and the file size. On this account, if applying this selecting method to a computer of hierarchy storage management type and thereby producing a candidate-file list, it is possible to insert into the upper sequential order of the candidate-file list a file whose last renewal day is old and which although having recently been casually accessed is not planned to be thereafter accessed for a while. Therefore, it becomes possible to replace such a file with a new transfer file with a priority.

Also, the present applicant proposes as described in claim 2 an apparatus for selecting a file comprising setting means for setting as lapse date conditions either one of a day on which the last renewal was made and a day on which the last access was made, procuring means for procuring information on the lapse date conditions and information on the file size regarding each one of a plurality of files stored in the memory means, calculating means for calculating a score regarding each of the respective files according to the number of days that have lapsed from the lapse date conditions and the file size, and selecting means for selecting a desired file from among the respective files by using the score.

According to this apparatus for selecting, by the user's performing setting with setting means and by the procuring means, the calculating means, and the selecting means performing the procurement of the information, the calculation of the score, and the selection of the file, it is possible to execute the method described in claim 1. On this account, if applying this selecting apparatus to a computer of hierarchy storage management type and thereby producing a candidate-file list, it is similarly possible to replace a file whose last renewal day is pretty old and which although having recently been casually accessed is not planned to be thereafter accessed for a while with a new transfer file with a priority.

Next, the present applicant proposes as described in claim 3 a method of selecting a file comprising a step of setting at least one of a multiplication factor used with respect to the number of days that have lapsed from a day on which the last access was made and a multiplication factor used with respect to the file size, a step of procuring information on a day on which the last access was made and information on the file size regarding each one of a plurality of files stored in the memory means, a step of calculating a score regarding each of the respective files according to the number of days that have lapsed from the day of the last access and the value obtained by multiplying the file size by the multiplication factor that has been set, and a step of selecting a desired file from among the respective files by using the score.

According to this method of selecting a file, when setting at least one of the multiplication factor used with respect to the number of days that have lapsed from a day on which the last access was made and the multiplication factor used with respect to the file size, a file is selected from among a plurality of the files stored in the memory means by using the score that has been calculated according to the lapse days number from the day of the last access and the value obtained by multiplying the file size by this multiplication factor.

Accordingly, by changing the multiplication factor he sets, the user can change the largeness/smallness relationship between the score of a file whose lapse days number is large and the score of a file whose size is large. Therefore, if applying this selecting method to the computer of hierarchy storage management type and thereby producing a candidate-file list, the user becomes able to flexibly decide that the user more preferentially replaces which one of the file whose lapse days number from the day of the last access is large and the file whose size is large with a new transfer file.

Also, the present applicant proposes as described in claim 4 an apparatus for selecting a file comprising setting means for setting at least one of a multiplication factor used with respect to the number of days that have lapsed from a day on which the last access was made and a multiplication factor used with respect to the file size, procuring means for procuring information on a day on which the last access was made and information on the file size regarding each one of a plurality of files stored in the memory means, calculating means for calculating a score regarding each of these respective files according to the number of days that have lapsed from the day of the last access and the value obtained by multiplying the file size by the multiplication factor that has been set by the setting means, and selecting means for selecting a desired file from among those respective files by using the score.

According to this apparatus for selecting, by the user's performing setting with setting means and by the procuring means, the calculating means, and the selecting means performing the procurement of the information, the calculation of the score, and the selection of the file, it is possible to execute the method described in claim 3. On this account, if applying this selecting apparatus to the computer of hierarchy storage management type and thereby producing a candidate-file list, the user becomes able to flexibly decide that the user more preferentially replaces which one of the file whose lapse days number from the day of the last access is large and the file whose size is large with a new transfer file.

Next, the present applicant proposes as described in claim 5 a method of selecting a file comprising a step of setting whether files under the same custody structure are preferentially selected, a step of procuring information on a day on which the last access was made and information on the file size regarding each one of a plurality of files stored in the memory means, a step of calculating a score regarding each of these respective files according to the number of days that have lapsed from the day of the last access and the file size, and a step of selecting a desired file from among these respective files by using the score and the result of the setting regarding whether files under the same custody structure are preferentially selected.

According to this method of selecting a file, when setting whether preferentially selecting a file under the same custody structure (e.g., the directory), a file is selected from among a plurality of files stored in the memory means by using the score that has been calculated according to the lapse days number from the day of the last access and the file size and the result of the setting regarding whether preferentially selecting a file under the same custody structure. Accordingly, in a case where having set so that the file under the same custody structure may be preferentially selected, when selecting a file, it is not the case that files are merely selected in the order in which the score is larger but the files under the same custody structure are preferentially selected.

For this reason, if applying this selecting method to the computer of hierarchy storage management type and thereby producing a candidate-file list, a plurality of files under the same custody structure within the buffer memory become able to be inserted in the same sequential order of the candidate-file list or in the successive sequential orders thereof.

As a result of this, a plurality of ones of the files under this custody structure that have been destined to being replaced with new transfer files are collectively replaced in a lump. Therefore, when having been moved to the main memory or external memory device, it becomes more likely to happen that they are stored in successive areas within this memory or memory device. As a result, when performing a search, restoration, etc. with respect to the files under this custody structure, as far as the main memory or external memory device is concerned, in an increasing number of cases it has become sufficient to give access to only the successive areas. And so it becomes possible to shorten the processing length of time such as that for a search, restoration, etc. to that extent.

Further, there has increased in number either a case where the files under this custody structure are all collectively replaced with new transfer files or a case where these files are all kept stored in the buffer memory as are. As a result, when performing a search, restoration, etc. withe respect to the files under this custody structure, in a growing number of cases it becomes sufficient to have access to only either one of the main memory or the external memory device. And so it becomes possible to shorten the processing length of time such as that for a search, restoration, etc. to that extent.

Also, the present applicant proposes as described in claim 6 an apparatus for selecting a file comprising setting means for setting whether files under the same custody structure are preferentially selected, procuring means for procuring information on a day on which the last access was made and information on the file size regarding each one of a plurality of files stored in the memory means, calculating means for calculating a score regarding each of these respective files according to the number of days that have lapsed from the day of the last access and the file size, and selecting means for selecting a desired file from among the respective files by using the score and the result of the setting performed by the setting means.

According to this apparatus for selecting, by the user's performing setting with setting means and by the procuring means, the calculating means, and the selecting means performing the procurement of the information, the calculation of the score, and the selection of the file, it is possible to execute the method described in claim 5. On this account, if applying this selecting apparatus to a computer of hierarchy storage management type and thereby producing a candidate-file list, it is none the less possible to collectively replace a plurality of files under the same directory within the buffer memory with new transfer files. And so it becomes possible to shorten the processing length of time such as that for a search, restoration, etc. with regard to the files under this custody structure.

BRIEF DESCRIPTION OF THE DRAWINGS

FIG. 10 is a diagram illustrating another example of the candidate-file list; and FIG. 11 is a diagram illustrating a sorted example of files that have been drawn off from the candidate-file list of FIG. 10.

DETAILED DESCRIPTION OF THE PREFERRED EMBODIMENTS

An explanation will now be given of an embodiment wherein the invention of this application has been applied to a personal computer.

Figure 1:
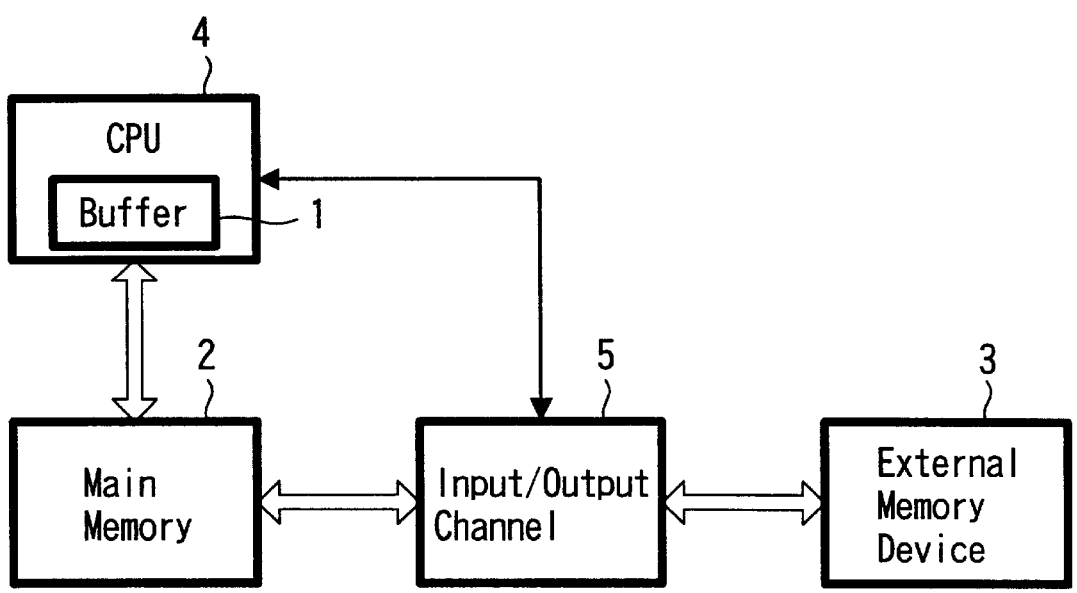
FIG. 1 is a block diagram illustrating an example of a hierarchical construction of a personal computer.

FIG. 1 illustrates an example of the hierarchical construction of a memory in a personal computer. This memory in the personal computer has a hierarchical construction in that there are combined a buffer memory 1 that consists of a high-speed and small-capacity SRAM, a main memory 2 that consists of a DRAM and ROM, whose speed is lower, and whose capacity is larger, than that of the buffer memory 1, and an external memory device 3 that consists of a hard disk drive, whose speed is again higher, and whose capacity is again larger, than the main memory 2.

The buffer memory 1 is mounted within a CPU (Central Processing unit) 4.

The external memory device 3 is connected to the CPU 4 via an input/output channel (hard disk controller) 5. In the external memory device 3 is stored an HSM software as one piece of the system software. When a power source of the personal computer is turned on, the CPU 4 automatically executes this HSM software.

Next, an example of the hierarchy storage management that is realized by the execution of this HSM software by the CPU 4 will be explained. This explanation will be made with a stress being put upon a processing for replacing part of a plurality of files already stored in the buffer memory with a new transfer file.

When the HSM software is executed, initially, an image screen for performing the setting of the following items (1) to (6) is displayed on a display (not illustrated) of the personal computer. The user sets these items beforehand by operating the keyboard or the mouse (not illustrated either) of the personal computer.

(1) The lapse date conditions,
(2) The virtual number of lapse days,
(3) The virtual size,
(4) The weight of the number of lapse days,
(5) The weight of the file size, and
(6) The priority degree of directory.

Among these items, regarding the item (1), either one of the last renewal day of a file and the last access day of the file is set as the lapse date conditions. For example, in a case where the user very casually happens to see a file that was produced in the past but does not thereafter need this file for a while, it is preferable to set the last renewal day as the lapse date conditions. On the other hand, in a case where the user sees a file that was once produced in the past and thereafter continues to see it a few, or several, times, it is preferable to set the last access day as the lapse date conditions.

Also, regarding the item (2), a given value of fraction or integer is set as the multiplication factor used with respect to the number of the days lapsed from the lapse date conditions under the item (1). Regarding the item (3), also, a given value of fraction or integer is set as the multiplication factor used with respect to the file size.

In a case where among the files within the buffer memory 1, it is wanted to preferentially replace a file whose size is large (i.e., a file that occupies a large area within the buffer memory 1) in comparison with a file regarding that the number of the days having lapsed from the last renewal day or the last access day is large, it is sufficient to make the multiplication factor set under the item (3) larger than that set under the item (2). On the other hand, in a case where it is wanted to preferentially replace a file regarding that the number of the days having lapsed from the last renewal day or the last access day is large, it is sufficient to make the multiplication factor set under the item (2) larger.

Also, regarding the item (4), it is set whether multiplying the number of the days lapsing from the lapse date conditions under the item (1) by the weight such as that which is obtained using the above-described equation (a). Regarding the item (5), also, it is set whether multiplying the file size by the weight such as that which is obtained using the above-described equation (a).

Also, regarding the item (6), the priority degree of directory is set to any one of the three priority degrees, a first one of which is to positively prioritze a file under the same directory, a second one of which is to prioritize a file under the same directory although the priority is not positive, and a third one of which is to leave the directories out of consideration.

In a case where it is wanted to replace a plurality of files under the same directory within the buffer memory 1 collectively, it is only needed to positively prioritize (or although not positively prioritize) a file under the same directory. On the other hand, in a case where it is not needed to replace a plurality of files under the same directory collectively, it is sufficient to set so as to leave the directories out of consideration.

It is to be noted that the settings under these items (1) to (6) may be done so that the contents thereof may be evenly executed with respect to the buffer memory 1 as a whole (namely, so that the contents of the settings may become equal with respect to every one of the files transferred to the buffer memory 1). However, it is also possible to evenly set with respect to the buffer memory as a whole and thereafter newly set with respect to each of the individual directories (namely, it may be arranged to change the contents of the settings with respect to the files only under a desired directory that are among the files transferred to the buffer memory 1).

When these settings are completed and thereafter access is requested to a file, for example, by executing a particular application software, the following processing is performed. Namely, it is investigated whether this file exists within the buffer memory 1. If the file exists, the file is read out from the buffer memory 1. If the file does not exist, the file is transferred from the main memory 2 or the external memory device 3 to the buffer memory 1. Thereafter, the file is read out from the buffer memory 1. By repeating this processing, the file that is more likely to have its access requested is sequentially stored into the buffer memory 1. Therefore, the access frequency of making access to the main memory 2 and the external memory device 3 is reduced, with the result that the average access length of time is shortened.

When during the repetition of this processing, for example, the space area of the buffer memory 1 becomes decreased to a value smaller than prescribed, the computer generates a request for production of a candidate-file list. And, according to this request, the candidate-file list is produced through the execution of a processing such as that which is illustrated in FIG. 2.

Figure 2:
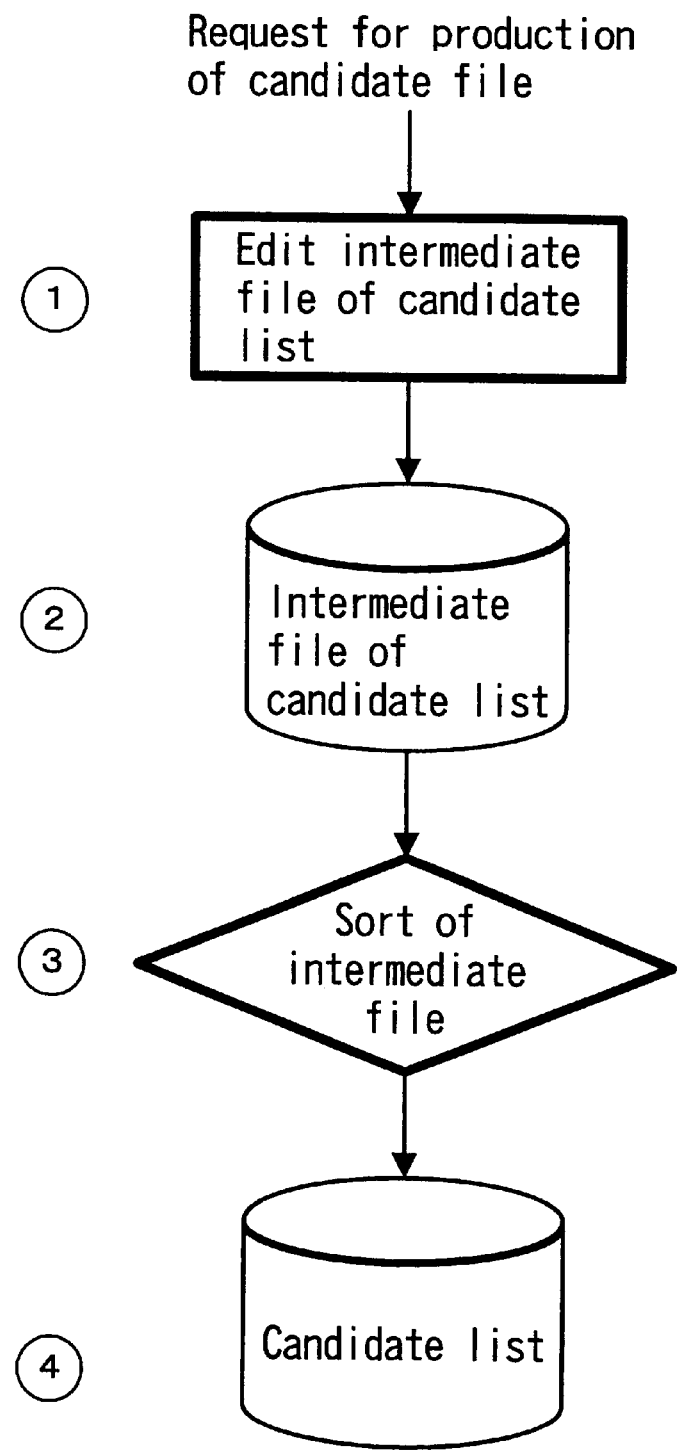
FIG. 2 is a flowchart illustrating an example of the process of production processing for producing a candidate-file list.

Namely, first, as illustrated by "1" in FIG. 2, the computer edits an intermediate file for production of the candidate-file list.

Figure 3:
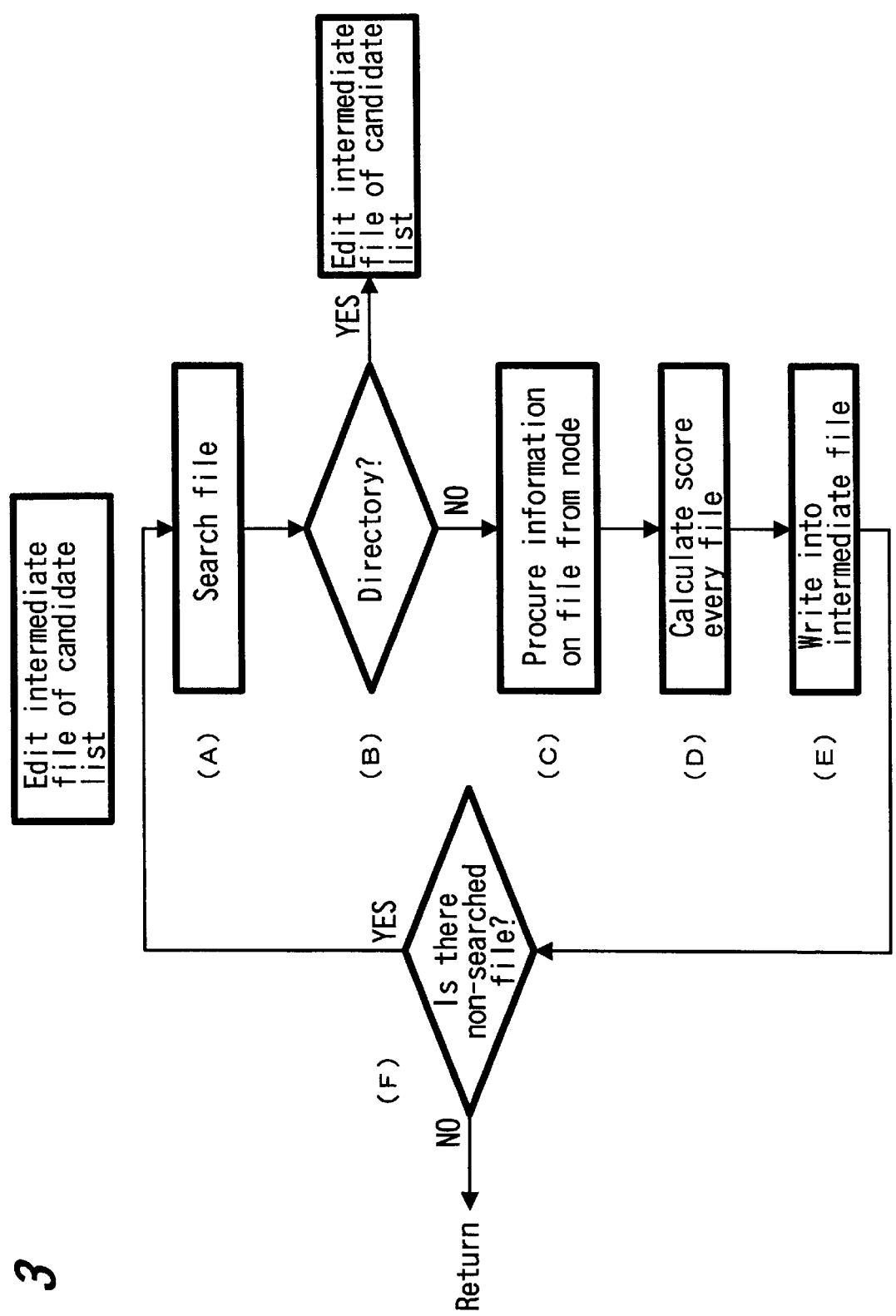
FIG. 3 is a flowchart illustrating an example of the process of edit processing for editing an intermediate file.

FIG. 3 illustrates the process of edit processing for performing this edition of the intermediate file. Initially, the computer searches one file within the buffer memory 1 (the processing (A)). Subsequently, the computer determines whether the file that has been searched is a file or a directory (the processing (B)).

If the searched data is a file, the flow immediately proceeds to the next processing (C). On the other hand, if the searched data is a directory, the computer recursively executes the processing steps (A) and (B) of FIG. 3 until the intended file is searched, and then the flow proceeds to a step of processing (C).

Figures 5, 6:
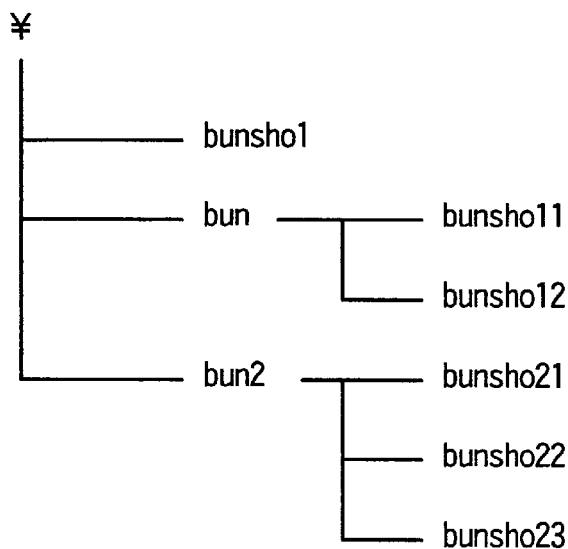
FIG. 5 is a diagram illustrating an example of the directory structure of files within a buffer memory 1.
FIG. 6 is a diagram illustrating an example of the intermediate file.

It is assumed here that, for example, files whose directory structure is as illustrated in FIG. 5 are stored in the buffer memory 1. In this case, when the data that has been searched in the processing (A) has been a "bunsho 1", since this data is a file, the flow immediately proceeds from the processing (B) to the processing (C). On the other hand, when the data that has been searched in the processing (A) is a "bun", since this data is a sub-directory of the files "bunsho 11" and "bunsho 12", the computer recursively executes the processing steps (A) and (B) of FIG. 3 until the "bunsho 11" and "bunsho 12" are searched. Thereafter, the flow proceeds to the processing (C). Similarly, when the data that has been searched in the processing (A) is a "bun 2", since this data is a sub-directory of the files "bunsho 21", "bunsho 22", and "bunsho 23", the computer recursively executes the processing steps (A) and (B) of FIG. 3 until the "bunsho 21", "bunsho 22", and "bunsho 23" are searched. Thereafter, the flow proceeds to the processing (C).

In the processing (C), an investigation is performed of the node information on the file that has been searched, thereby getting the following information items (7) and (8).

(7) The number of lapse days that of the last renewal day and last access day of this file have lapsed from the day set as the above-described lapse date conditions under the item (1) to the present day (days). And, (8) File size (kilobytes).

And, regarding this file, according to the results of the settings under the above-described items (2) to (5), the score thereof is calculated in accordance with the following equation (b) (the processing (D)).

$$\text{Score}=(7)\times(2)\times(4)+(8)\times(3)\times(5) \tag{b}$$

Accordingly, in a case where under the item (1) the last renewal day of a file has been set as the lapse date conditions, the larger is the number of lapse days, regarding this file, that are counted from the last renewal day, the larger is the score. On the other hand, in a case where the last access day has been set as the lapse date conditions, the larger is the number of lapse days, regarding this file, that are counted from the last access day, the larger is the score.

Also, the greater is the multiplication factor that has been set under the item (2), the higher becomes the increase degree of the score of the file, regarding which the number of lapse days that are counted from the last renewal day or the last access day. On the other hand, the greater is the multiplication factor that has been set under the item (3), the higher becomes the increase degree of the score of the file, regarding which the size is large.

Subsequently, the computer writes the calculated score and the absolute path name (the path name originating from the root directory, which covers all relevant directory portions) of the file into the intermediate file and stores them (for example, writes them into the working area of the DRAM of the main memory 2) (the processing (E)).

Subsequently, the computer judges whether there are any files that have not been searched yet in the buffer memory 1 (the processing (F)). If there are the non-searched files, the computer repeats the processing steps (A) to (E).

And when the non-searched files cease to exist as a result of the execution of the processing steps (A) to (E) with respect to each and every file within the buffer memory 1, the computer terminates this edit processing of the intermediate file. As a result of this, as illustrated by (2) of FIG. 2, there is produced the intermediate file for production of the candidate-file list, whose contents are the scores and the absolute path names of the respective files within the buffer memory 1.

In the case of the above-described example of FIG. 5, as illustrated in FIG. 6, this intermediate file has the following contents: the scores S1, S11, S12, S21, S22, and S23 of the respective files "bunsho 1", "bunsho 11", "bunsho 12", "bunsho 21", "bunsho 22", and "bunsho 23" and their absolute path names "¥bunsho 1", "¥bun¥bunsho 11", "¥bunbunsho 12", "¥bun2¥bunsho 21", "¥bun2¥bunsho 22", and "¥bun2¥bunsho 23".

Next, as illustrated by "3" of FIG. 2, the computer sorts the intermediate file.

Figure 4:
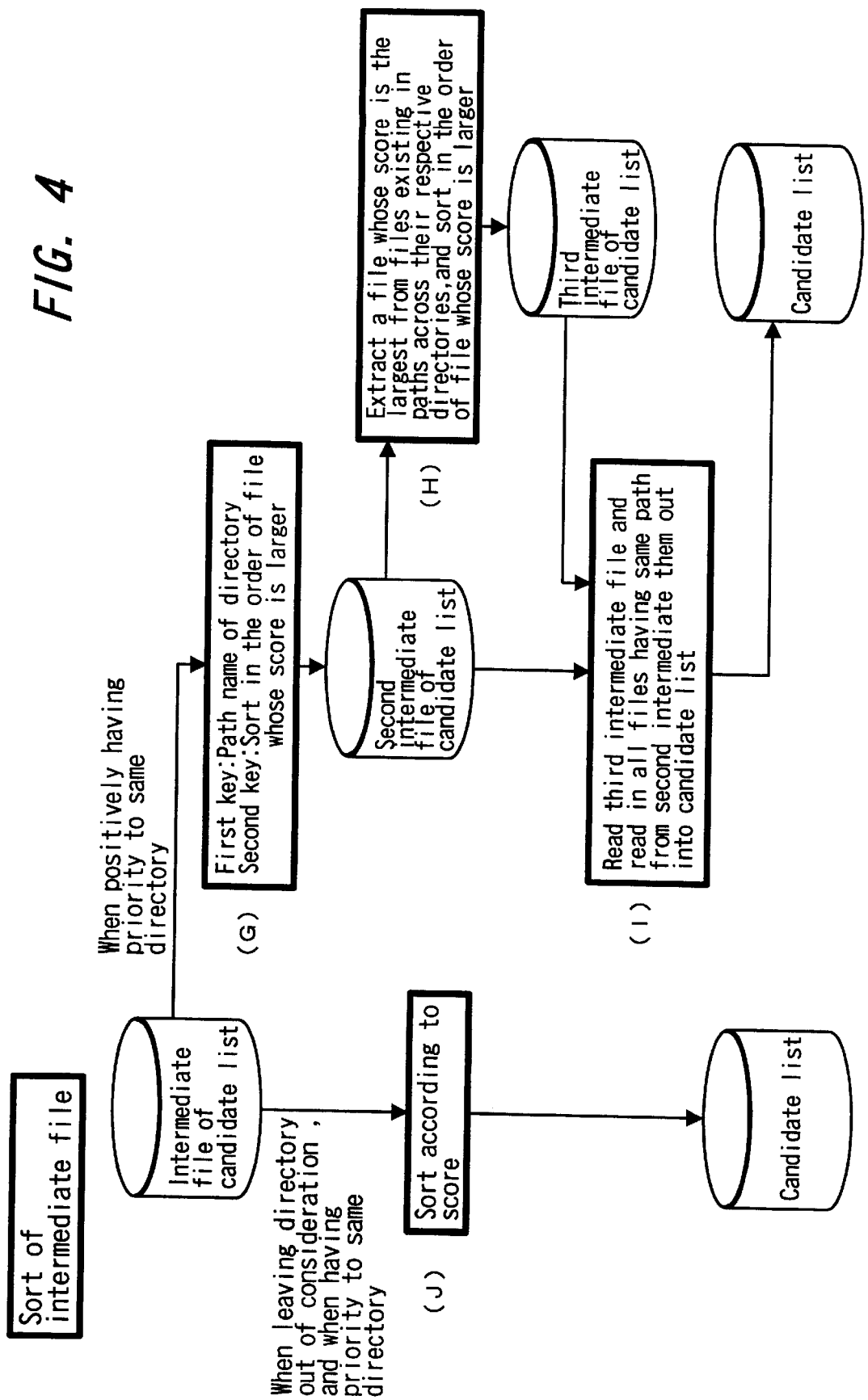
FIG. 4 is a flowchart illustrating an example of the process of sort processing for sorting the intermediate file.

FIG. 4 illustrates the process of the sort processing of sorting this intermediate file.

When the result of the setting under the item (6) has been set to positively prioritizing files under the same directory, the intermediate file is sorted (re-arranged) using the path name of the directory as a first key. Thereafter, the intermediate file is sorted using the size of the score as a second key (the processing (G)). A second intermediate file 2 is produced.

Figures 7, 8, 9:
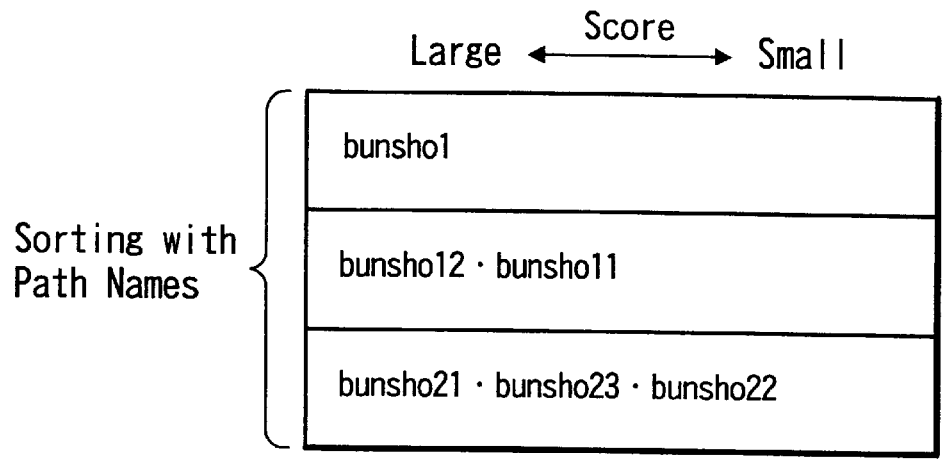
FIG. 7 is a diagram illustrating an example of the intermediate file 2.
FIG. 8 is a diagram illustrating an example of the intermediate file 3.
FIG. 9 is a diagram illustrating an example of the candidate-file list.

In a case where in said FIG. 6 the largeness/smallness relationship of the scores is, for example, S21>S12>S23>S1>S22>S11, the intermediate file 2 is classified into three ways, a first one of which is the file "bunsho 1", the files "bunsho 11" and "bunsho 12", and the files "bunsho 21", "bunsho 22", and "bunsho 23", using the first key as shown FIG. 7. And simultaneously, regarding the files "bunsho 11" and "bunsho 12", the "bunsho 12" and "bunsho 11" are sequentially arranged in this order, and, regarding the files "bunsho 21", "bunsho 22", and "bunsho 23", also, the "bunsho 21", "bunsho 23", and "bunsho 22" are sequentially arranged in this order, each, using the second key.

Subsequently, from the inside of the intermediate file 2, there is extracted a file whose score is maximum from the files that exist in the path of each directory. And the respective files that have been extracted are sorted in the sequential order from the file that is larger in score (the processing (H)), thereby producing a third intermediate file 3.

In the case of the example of said FIG. 7, this intermediate file 3 has a structure wherein as illustrated in FIG. 8 the files are arranged in the order of "bunsho 21", "bunsho 12", and "bunsho 1".

And, the files are read one by one sequentially from the uppermost order of the intermediate file 3, and the files whose path name is the same as that of the thus-read file are all read in from the intermediate file 2. And these files are written out, as the same order, into the candidate-file list (the processing (I)). As a result of this, as illustrated by "4" of FIG. 2, this candidate-file list is produced.

In the case of the example of said FIG. 7, this candidate-file list has a structure wherein as illustrated in FIG. 9 the first-order files are "bunsho 21", "bunsho 22", and "bunsho 23"; the second-order files are "bunsho 11" and "bunsho 12", and the third-order file is "bunsho 1".

In this way, when the result of the setting under the item (6) was the setting of that the files under the same directory are positively prioritized, there is produced the candidate-file list wherein a plurality of files under the same directory (here under the sub-directory) are inserted into the same order.

Incidentally, in the processing (I), the files whose path name is the same may be written out into the candidate-file list not as the same order but in the form of successive orders. By doing so, it may be also arranged to produce the candidate-file list wherein a plurality of files under the same directory are inserted into the successive orders (in the case of the example of said FIG. 7 a candidate-file list wherein the files of "bunsho 21", "bunsho 23", "bunsho 22", "bunsho 12", "bunsho 11", and "bunsho 1" are arranged from the first to the sixth order in the order mentioned).

On the other hand, when the result of the setting under the item (6) has been set to prioritizing (although not positively) the files under the same directory or to leaving the directories out of consideration, the computer sorts the intermediate file in the order in which the score is larger (the processing (J)), thereby producing the candidate-file list.

In a case where, in said FIG. 6, for example, the largeness/smallness relationship of the scores is S21>S12>S23>S1>S22>S11, this candidate-file list has a structure wherein as illustrated in FIG. 10 the files of "bunsho 21", "bunsho 12", "bunsho 23", "bunsho 1", "bunsho 22", and "bunsho 11" are arranged from the first to the sixth order in the order mentioned.

When actually replacing after having produced the candidate-file list in this way, according to this candidate-file list, a prescribed amount of files of the files stored in the buffer memory 1 is replaced with new transfer files (is moved to the main memory 2 or the external memory device 3).

At this time, when the result of the setting under the item (6) has been set to positively prioritizing the files under the same directory, according to the priority order of the candidate-file list that is as it is, this prescribed amount of files that is inserted in the uppermost order thereof is replaced with new transfer files. As a result of this, of the files under the same directory within the buffer memory 1, a plurality of files that are destined to being replaced with new transfer files are collectively replaced (are moved to the main memory 2 or the external memory device 3). Also, either a case where the files under this directory are all collectively replaced with new transfer files or a case where those files are all kept stored within the buffer memory 1 as are becomes large in number.

Namely, in the example of FIG. 9, where, for example, two files are replaced, of the three files under the sub-directory "bun" the two files "bunsho 21" and "bunsho 22" are collectively replaced. Also, where, for example, three files are replaced, the three files "bunsho 21", "bunsho 22", and "bunsho 23" under the sub-directory "bun" are all collectively replaced. Also, where, for example, five files are replaced, the two files "bunsho 12" and "bunsho 11" under the sub-directory "bun 2" are all collectively replaced.

On the other hand, when the result of the setting under the item (6) has been the setting of prioritizing (although not positively) the files under the same directory, first, a prescribed amount of files that is constituted by the upper-order files (the files whose score is larger) of the candidate-file list is drawn off sequentially from the upper order. And, the thus-drawn-off files are sorted according to the path names and then replaced. As a result, only within this drawn-off-file range, the files under the same directory are collectively replaced.

Namely, in the example of FIG. 10, where, for example, three files are replaced, the files "bunsho 21", "bunsho 12", and "bunsho 23" that are in the first to the third order are drawn off. And these files are replaced after having been re-arranged in the form of "bunsho 21", "bunsho 23", and "bunsho 12". As a result of this, the two files "bunsho 21" and "bunsho 22" under the sub-directory "bun" are collectively replaced. Also, where, for example, five files are replaced, the files "bunsho 21", "bunsho 12", "bunsho 23", "bunsho 1" and "bunsho 22" in the first to the fifth sequential order are drawn off. And these files are replaced after having been re-arranged in the form of "bunsho 21", "bunsho 22", "bunsho 23", "bunsho 12", and "bunsho 1" as illustrated in FIG. 11. As a result of this, the three files "bunsho 21", "bunsho 22", and "bunsho 23" under the sub-directory "bun" are all collectively replaced.

Also, when the result of the setting under the item (6) has been the setting of that the directories are left out of consideration, according to the priority order of the candidate-file list that is as it is, the prescribed amount of files that is inserted in the upper order (the files whose score is larger) is replaced with new transfer files (in the case of the example of FIG. 10 the files "bunsho 21", "bunsho 12", "bunsho 23", "bunsho 1", "bunsho 22", and "bunsho 11" are replaced in the order mentioned.

In this way, comparing the degree of collective replacement of the files under the same directory at the point in time when the result of the setting under the item (6) has been to positively prioritizing the files under the same directory with that at the point in time when said result has been to prioritize these files although not positively, although depending on the amount of files that are replaced at one time, generally, the degree at the latter point in time becomes lower. Accordingly, which one of whether positively prioritizing the files under the same directory or whether although not positively prioritizing these files the setting under the item (6) is made to has only to be determined according to the amount of files replaced at one time and to what extent the desire is high of collectively replacing a plurality of files under the same directory.

As has been described above, in this personal computer, by the user's setting the last renewal day of a file as the lapse date conditions under the item (1), of the files within the buffer memory 1, it is possible to insert into the upper sequential order the file whose last renewal day is old and which although recently having casually been accessed is not planed to be accessed for a while. Therefore, it becomes possible to preferentially replace such a file with a new transfer file.

Also, by the user's changing the multiplication factor he sets under the item (2) or (3), it becomes possible for the user to decide which one of the file whose lapse days number from the last renewal day or last access day is large and the file whose file size is large should be preferentially replaced with a new transfer file, with a high level of flexibility.

Also, by the user's performing the setting under the item (6) so that the files under the same directory may be positively prioritized (or although not positively prioritized) of, it becomes possible, of the files under the same directory within the buffer memory 1, to collectively replace a plurality of files that have been destined to being replaced with new transfer files. Also, either a case where the files under this directory are all collectively replaced with new transfer files or a case where these files are kept stored within the buffer memory 1 as are becomes many.

As a result of this, of the files under this directory, a plurality of files that have been destined to being replaced with new transfer files become more and more likely to be stored in the successive areas within the memory when having been moved to the main memory 2 or the external memory 3. As a result, when searching or restoring the files under this directory, a case where regarding the main memory 2 or the external memory device 3 access has only to be given to the successive areas becomes many. And therefore it becomes possible to shorten the processing length of time for a search, restoration, etc. to that extent.

Further, when searching, restoring, etc. the files under this directory, there increases in number the case where access has only to be given to only either one of the main memory 2 or the external memory device 3 and the buffer memory 1. And therefore it becomes possible to shorten the processing length of time for a search, restoration, etc. to that extent.

Incidentally, in the above-described examples, it is arranged that on the premise that the files whose score is larger are inserted in the upper order of the candidate-file list (accordingly are replaced with priority) a plurality of files under the same directory be collectively replaced by setting the item (6). However, instead thereof, or in addition thereto, through the designation of a particular directory made by the user's operating the keyboard or the mouse, it may be arranged that a plurality of files under this directory be inserted in the same sequential order or in the successive orders of the candidate-file list (accordingly be preferentially collectively replaced) regardless of the largeness or smallness of the score thereof.

Also, the invention of this application obviously can be applied not only to a personal computer that performs its hierarchy storage management by providing the memories having a hierarchical structure such as that illustrated in FIG. 1, but also to a personal computer that performs its hierarchy storage management by providing memories having another suitable hierarchical structure (e.g., a personal computer that has further provided therein a middle-speed buffer memory between the buffer memory and the main memory, or the one that has further provided therein an extended memory using a semiconductor storage element in addition to the auxiliary memory device), or a computer (e.g., a work station) other than a personal computer.

Also, the invention of this application can be also utilized in order to select files from among a plurality of files stored in the memory from other aspects than the hierarchy storage management.

Also, the invention of this application is not limited to the above-described embodiments or modifications but of course permits various other constructions to be made without departing from the subject matter of the invention.

As has been described above, if applying the selecting method of a file that is described in claim 1 of this application, or the selecting apparatus of a file that is described in claim 2 thereof to a computer of hierarchy storage management type and thereby producing a candidate-file list, it is possible to insert into the upper sequential order a file whose last renewal day is old and which although recently having casually been accessed is not planned to be accessed for a while. Therefore, it advantageously becomes possible to preferentially replace such a file with a new transfer file.

Also, if applying the selecting method of a file that is described in claim 3 of this application, or the selecting apparatus of a file that is described in claim 4 thereof to a computer of hierarchy storage management type and thereby producing a candidate-file list, it advantageously becomes possible for the user to decide which one of the file whose lapse days number from the last renewal day or last access day is large and the file whose file size is large should be preferentially replaced with a new transfer file, with a high level of flexibility.

Also, if applying the selecting method of a file that is described in claim 5 of this application, or the selecting apparatus of a file that is described in claim 6 thereof to a computer of hierarchy storage management type and thereby producing a candidate-file list, it becomes possible to collectively replace a plurality of files under the same custody structure within the buffer memory with new transfer files. Therefore, it advantageously becomes possible to shorten the processing length of time such as a search, restoration, etc. with regard to this custody structure.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method of selecting a file, the method being adapted to select a file from among a plurality of files stored in memory means, the method comprising:

a step of setting as lapse date conditions either one of a day on which the last renewal was made and a day on which the last access was made;

a step of procuring information on the lapse date conditions and information on the file size regarding each one of the respective files stored in the memory means;

a step of calculating a score regarding each of the respective files according to the number of days that have lapsed from the lapse date conditions and the file size; and a step of selecting a desired file from among the respective files by using the score.

2. An apparatus for selecting a file, the apparatus being adapted to select a file from among a plurality of files stored in memory means, the apparatus comprising:

setting means for setting as lapse date conditions either one of a day on which the last renewal was made and a day on which the last access was made;

procuring means for procuring information on the lapse date conditions and information on the file size regarding each one of the respective files stored in the memory means;

calculating means for calculating a score regarding each of the respective files according to the number of days that have lapsed from the lapse date conditions and the file size; and selecting means for selecting a desired file from among the respective files by using the score.

3. A method of selecting a file, the method being adapted to select a file from among a plurality of files stored in memory means, the method comprising:

a step of setting at least one of a multiplication factor used with respect to the number of days that have lapsed from a day on which the last access was made and a multiplication factor used with respect to the file size;

a step of procuring information on a day on which the last access was made and information on the file size regarding each one of the respective files stored in the memory means;

a step of calculating a score regarding each of the respective files according to the number of days that have lapsed from the day of the last access and the value obtained by multiplying the file size by the multiplication factor that has been set; and a step of selecting a desired file from among the respective files by using the score.

4. An apparatus for selecting a file, the apparatus being adapted to select a file from among a plurality of files stored in memory means, the apparatus comprising:

setting means for setting at least one of a multiplication factor used with respect to the number of days that have lapsed from a day on which the last access was made and a multiplication factor used with respect to the file size;

procuring means for procuring information on a day on which the last access was made and information on the file size regarding each one of the respective files stored in the memory means;

calculating means for calculating a score regarding each of the respective files according to the number of days that have lapsed from the day of the last access and the value obtained by multiplying the file size by the multiplication factor that has been set; and selecting means for selecting a desired file from among the respective files by using the score.

5. A method of selecting a file, the method being adapted to select a file from among a plurality of files stored in memory means, the method comprising:

a step of setting whether files under the same custody structure are preferentially selected;

a step of procuring information on a day on which the last access was made and information on the file size regarding each one of the respective files stored in the memory means;

a step of calculating a score regarding each of the respective files according to the number of days that have lapsed from the day of the last access and the file size; and a step of selecting a desired file from among the respective files by using the score and the result of the setting regarding whether files under the same custody structure are preferentially selected.

6. An apparatus for selecting a file, the apparatus being adapted to select a file from among a plurality of files stored in memory means, the apparatus comprising:

setting means for setting whether files under the same custody structure are preferentially selected;

procuring means for procuring information on a day on which the last access was made and information on the file size regarding each one of the respective files stored in the memory means;

calculating means for calculating a score regarding each of the respective files according to the number of days that have lapsed from the day of the last access and the file size; and selecting means for selecting a desired file from among the respective files by using the score and the result of the setting performed by the setting means.

* * * * *